(12) United States Patent
Liang et al.

(10) Patent No.: US 9,886,425 B2
(45) Date of Patent: Feb. 6, 2018

(54) INTELLIGENT SWITCHING METHOD AND SYSTEM FOR BROWSER KERNEL

(71) Applicant: Guangzhou UCWEB Computer Technology Co., Ltd., Guangdong (CN)

(72) Inventors: Jie Liang, Guangdong (CN); Yonggang Jiang, Guangdong (CN)

(73) Assignee: GUANGZHOU UCWEB COMPUTER TECHNOLOGY CO., LTD., Guangdong (CN)

( * ) Notice: Subject to any disclaimer, the term of this patent is extended or adjusted under 35 U.S.C. 154(b) by 484 days.

(21) Appl. No.: 14/555,462

(22) Filed: Nov. 26, 2014

(65) Prior Publication Data

US 2015/0088984 A1   Mar. 26, 2015

Related U.S. Application Data

(63) Continuation of application No. PCT/CN2013/076147, filed on May 23, 2013.

(30) Foreign Application Priority Data

May 26, 2012 (CN) .......................... 2012 1 0167919

(51) Int. Cl.
*G06F 15/16* (2006.01)
*G06F 17/22* (2006.01)
(Continued)

(52) U.S. Cl.
CPC .... *G06F 17/2247* (2013.01); *G06F 17/30899* (2013.01); *H04L 67/02* (2013.01); *H04W 4/001* (2013.01)

(58) Field of Classification Search
CPC ......... H04L 67/02; H04L 67/32; H04L 67/42; G06F 17/30893; G06F 17/30899; G06F 17/2235; G06F 21/128; G06F 9/54
See application file for complete search history.

(56) References Cited

U.S. PATENT DOCUMENTS

| | | | |
|---|---|---|---|
| 2004/0073626 A1* | 4/2004 | Major ............... | G06F 17/30905 709/217 |
| 2008/0102840 A1* | 5/2008 | Ahn ...................... | H04W 60/04 455/440 |
| 2009/0299938 A1 | 12/2009 | Schneider | |

FOREIGN PATENT DOCUMENTS

| | | |
|---|---|---|
| CN | 101655863 A | 2/2010 |
| CN | 102385594 * | 8/2010 |

(Continued)

*Primary Examiner* — Aftab N. Khan
*Assistant Examiner* — Anh Nguyen
(74) *Attorney, Agent, or Firm* — Anova Law Group, PLLC (57) ABSTRACT

An intelligent switching method and system for a browser kernel at least including a first browser kernel unsupportive to a first page markup language and a second browser kernel unsupportive to a second page markup language. The method may include: determining which one of the first and the second browser kernels is the currently used browser kernel, determining whether or not a webpage adopts the first page markup language if the currently used browser kernel is the first browser kernel, if so, switching to the second browser kernel for processing, or determining whether or not a webpage adopts the second page markup language if the currently used browser kernel is the second browser kernel, if so, transferring an access via a cloud server or determining, by the cloud server, whether or not to switch to the first browser kernel for processing, otherwise, opening the page using the second browser kernel.

19 Claims, 2 Drawing Sheets

(51) Int. Cl.
*G06F 17/30* (2006.01)
*H04L 29/08* (2006.01)
*H04W 4/00* (2009.01)

(56) References Cited

FOREIGN PATENT DOCUMENTS

| | | | |
|---|---|---|---|
| CN | 101916276 A | | 12/2010 |
| CN | 102385594 A | | 3/2012 |
| CN | 102467565 A | * | 5/2012 |
| CN | 102722551 A | | 10/2012 |

* cited by examiner

INTELLIGENT SWITCHING METHOD AND SYSTEM FOR BROWSER KERNEL

CROSS REFERENCE TO RELATED APPLICATIONS

This application claims the benefit of International Patent Application No. PCT/CN2013/076147, title "INTELLIGENT SWITCHING METHOD AND SYSTEM FOR BROWSER KERNEL," filed May 23, 2013, which claims the benefit of Chinese Patent Application No. 201210167919.0, titled "INTELLIGENT SWITCHING METHOD AND SYSTEM FOR BROWSER KERNEL," filed May 26, 2012, each of which is incorporated by reference herein.

FIELD

Embodiments relate to the technical field of mobile device communications, and more particularly to an intelligent switching method and system for a browser kernel.

BACKGROUND

Most third-party browsers for mobile terminals (e.g. mobile phones) currently available on the market lack their own browser kernel and use a webkit kernel provided by operating systems of the mobile devices (e.g., the mobile browser on an android or iPhone platform) so as to adapt to market changes and market demands. However, conventional browser kernels built in the operating systems occupying a large portion of memory, provide no support to wap1.0 protocol (that is, wireless application protocol 1.0 which uses wml as a page markup language), among other problems. As a result, many webpages cannot be browsed or the connection to the Internet fails due to insufficient memory.

In contrast, the UC browser of UCWeb, Inc. has its own kernel capacity. For example, the second generation kernel of the UC browser, the U2 kernel, is capable of parsing wap1.0/wap2.0 independently.

Therefore, the U2 kernel (hereinafter, "U2") and a webkit kernel coexist on the platform of a mobile device to address the problem that a webkit kernel is unsupportive to wap1.0 protocol. Nonetheless, although capable of supporting wap protocols, the U2 cannot parse a web page (e.g. an html4 page and the currently prevailing html5 page) without a cloud terminal (or cloud server) which parses an html4 page with the parsed page presented beautifully and the traffic saved, and parses an html5 page with the layout of the page presented unattractively, and therefore fails to realize an optimal display effect.

Thus, how to parse different kinds of pages and achieve an optimal display effect becomes an urgent problem to be addressed in the field.

BRIEF SUMMARY

Through applied effort, ingenuity, and innovation, solutions to improve such systems have been realized and are described herein. Some embodiments may provide for an intelligent switching method for a browser kernel, the browser kernel at least comprising a first browser kernel unsupportive to a first page markup language and a second browser kernel supportive to the first page markup language and unsupportive to a second page markup language, comprising: determining which one of the first browser kernel and the second browser kernel is a currently used browser kernel by a mobile terminal; in response to determining that the currently used browser kernel is the first browser kernel, determining whether or not a webpage accessed by the mobile terminal adopts the first page markup language; in response to determining that the webpage adopts the first page markup language, switching to the second browser kernel for processing and opening the page using the second browser kernel; in response to determining that the currently used browser kernel is the second browser kernel, determining whether the webpage adopts the second page markup language; and in response to determining that the webpage adopts the second page markup language, transferring an access via a cloud server or determining, by the cloud server, whether or not to switch to the first browser kernel for processing.

In some embodiments, the first browser kernel is a self-contained browser kernel of an operating system of the mobile terminal, and the second browser kernel is a third-party browser kernel.

In some embodiments, the first browser kernel is a webkit kernel, and the first page markup language is wml.

In some embodiments, the second page markup language is html.

In some embodiments, a white list of mandatory direct connections of the second browser kernel is configured in the mobile terminal, whether or not a web address opened by the user is on the white list of mandatory direct connections of the second browser kernel is determined before the browser kernel currently used by the user of the mobile terminal is recognized, and the page is forcedly parsed using the second browser kernel if the web address opened by the user is on the white list of mandatory direct connections of the second browser kernel.

In some embodiments, before the browser kernel currently used by the user of the mobile terminal is recognized, if white list of mandatory direct connections of the second browser kernel is not configured in the mobile terminal or the web address opened by the user is not on the white list of mandatory direct connections of the second browser kernel, then whether or not a mandatory kernel parse command is carried in the web address opened by the user is determined, and if a mandatory kernel parse command is carried in the web address opened by the user, the page is forcedly parsed using a corresponding browser kernel.

In some embodiments, a screen fitting white list is configured in the mobile terminal, in the case where the first browser kernel is used, if the second page markup language is not adopted by the webpage opened by the user, then whether or not the web address opened by the user is on the screen fitting white list is determined, if so, the page is forcedly parsed using the second browser kernel, otherwise, the page is opened using the first browser kernel.

In some embodiments, a first browser kernel white list is configured in the mobile terminal, in the case where the second browser kernel is used, whether or not the web address opened by the user is on the first browser kernel white list is determined, regardless of whether or not the first page markup language is adopted by the webpage opened by the user, if the web address opened by the user is on the first browser kernel white list, the page is forcedly parsed using the first browser kernel.

In some embodiments, a first browser kernel white list is configured in the cloud server, whether or not the web address opened by the user is on the first browser kernel white list is determined when an access is transferred by the cloud server, and if the web address opened by the user is on the first browser kernel white list, the mobile terminal is required to forcedly parse the page using the first browser kernel.

In some embodiments, if no first browser kernel white list is configured in the cloud server or the web address opened by the user is not on the first browser kernel white list of the cloud server, then it is determined whether or not a page feature requiring to be presented using the first browser kernel is contained in the page opened by the user, and if a page feature requiring to be presented using the first browser kernel is contained in the page opened by the user, the mobile terminal is required to forcedly parse the page using the first browser kernel.

In some embodiments, a network environment is determined when the page is opened using the first browser kernel or the second browser kernel, if the first browser kernel is used and the network environment is 2G, then the user is prompted to use the second browser kernel; and if the second browser kernel is used and the network environment is 3G or WIFI, the user is prompted to use the first browser kernel.

Some embodiments may provide for an intelligent switching system for a browser kernel, comprising: an intelligent client kernel control module configured in a mobile terminal to: determine which one of a first browser kernel and a second browser kernel is a currently used browser kernel by a mobile terminal, wherein the first browser kernel unsupportive to a first page markup language and the second browser kernel supportive to the first page markup language and unsupportive to a second page markup language; in response to determining that the currently used browser kernel is the first browser kernel, determining whether or not a webpage accessed by the mobile terminal adopts the first page markup language; in response to determining that the webpage adopts the first page markup language, switching to the second browser kernel for processing and opening the page using the second browser kernel; in response to determining that the currently used browser kernel is the second browser kernel, determining whether the webpage adopts the second page markup language; and in response to determining that the webpage adopts the second page markup language, transferring an access via a cloud server; a cloud intelligent recognition and kernel control module located at the cloud server terminal to transfer an access to the second page markup language and determine whether or not to switch to the first browser kernel for processing; and a background kernel control module located in a background server to configure a white list related to each kernel.

In some embodiments, the first browser kernel is a self-contained browser kernel of an operating system of the mobile terminal, and the second browser kernel is a third-party browser kernel.

In some embodiments, the first browser kernel is a webkit kernel, and the first page markup language is wml.

In some embodiments, the second page markup language is html.

In some embodiments, a white list of mandatory direct connections of the second browser kernel is configured in the mobile terminal; the intelligent client kernel control module is further configured to: determine whether or not a web address opened by the user is on the white list of mandatory direct connections of the second browser kernel before the browser kernel currently used by the user of the mobile terminal is recognized; and forcedly parse the page using the second browser kernel if the web address opened by the user is on the white list of mandatory direct connections of the second browser kernel.

In some embodiments, the intelligent client kernel control module is further configured to: before the browser kernel currently used by the user of the mobile terminal is recognized, if white list of mandatory direct connections of the second browser kernel is not configured in the mobile terminal or the web address opened by the user is not on the white list of mandatory direct connections of the second browser kernel, determine whether or not a mandatory kernel parse command is carried in the web address opened by the use; and if a mandatory kernel parse command is carried in the web address opened by the user, forcedly parse the page using a corresponding browser kernel.

In some embodiments, a screen fitting white list is configured in the mobile terminal; the intelligent client kernel control module is further configured to: in the case where the first browser kernel is used, if the second page markup language is not adopted by the webpage opened by the user, determine whether or not the web address opened by the user is on the screen fitting white list; and in response to determining that the web address opened by the user is on the screen fitting white list, forcedly parse the page using the second browser kernel; in response to determining that the web address opened by the user fails to be on the screen fitting white list, open the page using the first browser kernel.

In some embodiments, a first browser kernel white list is configured in the mobile terminal, in the case where the second browser kernel is used; and the intelligent client kernel control module is further configured to: whether or not the web address opened by the user is on the first browser kernel white list is determined, regardless of whether or not the first page markup language is adopted by the webpage opened by the user, if the web address opened by the user is on the first browser kernel white list, forcedly parse the page using the first browser kernel.

In some embodiments, a first browser kernel white list is configured in the cloud server; and the intelligent client kernel control module is further configured to: whether or not the web address opened by the user is on the first browser kernel white list is determined when an access is transferred by the cloud server, and if the web address opened by the user is on the first browser kernel white list, forcedly parse the page using the first browser kernel.

In some embodiments, the intelligent client kernel control module is further configured to: if no first browser kernel white list is configured in the cloud server or the web address opened by the user is not on the first browser kernel white list of the cloud server, determine whether or not a page feature requiring to be presented using the first browser kernel is contained in the page opened by the user; and in response to determining that the page feature requiring to be presented using the first browser kernel is contained in the page opened by the user, forcedly parse the page using the first browser kernel.

In some embodiments, the intelligent client kernel control module is further configured to: determine a network environment when the page is opened using the first browser kernel or the second browser kernel; if the first browser kernel is used and the network environment is 2G, then prompt the user to use the second browser kernel; and if the second browser kernel is used and the network environment is 3G or WIFI, prompt the user to use the first browser kernel.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Having thus described some embodiments in general terms, reference will now be made to the accompanying drawings, which are not necessarily drawn to scale, and wherein:

DETAILED DESCRIPTION

Figure 1:
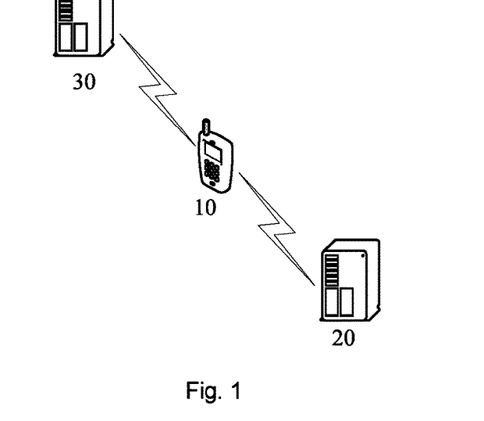
FIG. 1 is a schematic diagram illustrating the structure of an intelligent switching system for a browser kernel in accordance with some embodiments.

As shown in FIG. 1, the intelligent switching system for a browser kernel may include an intelligent client kernel control module 10, a cloud intelligent recognition and kernel control module 20, and a background kernel control module 30. The intelligent client kernel control module 10 interacts with the cloud intelligent recognition and kernel control module 20 to perform cloud intelligent recognition and kernel control, and acquires a corresponding kernel control white list from the background kernel control module 30.

The browser kernel at least includes a first browser kernel which may be a self-contained browser kernel of the operating system of a mobile terminal and unsupportive to a first page markup language and a second browser kernel which may be a third-party browser kernel supportive to the first page markup language but unsupportive to a second page markup language.

Each of the modules is described below in detail based on an example in which the self-contained browser kernel of the operating system of a mobile terminal is a webkit kernel (unsupportive to a first page markup language of wml) and the third-party browser kernel is a third-party browser kernel incapable of parsing a webpage (that is, a page adopting a second page markup language of html, such as an html4 page or an html5 page).

The intelligent client kernel control module 20 is located in a mobile terminal (e.g. a mobile browser) to intelligently control the kernel switching of a browser. The intelligent client kernel control module 20 intelligently switches between page parsing kernels based on at least one of a network environment, a memory threshold, a white list control, a service control command, the identification on a cloud identifier, the identification on a page type, and/or the identification on a domain name.

In specific embodiments of the disclosure, the intelligent client kernel control module 20 intelligently switches between browser kernels mainly using the following methods:

a. configure a white list of mandatory direct connections of a third-party browser kernel (e.g. a white list of mandatory U2 direct connections) in a mobile terminal, determine whether or not the web address accessed by the mobile terminal (e.g., opened by the user) is on the white list of mandatory direct connections of the third-party browser kernel, if so, forcedly parse the page using the third-party browser kernel.

b. determine whether or not the web address accessed by the mobile terminal contains a mandatory kernel parsing command, if so, forcedly parse the page using a corresponding browser kernel.

c. determine whether or not the browser kernel currently used by the mobile terminal is the self-contained browser kernel (e.g. webkit kernel) of the operating system of the mobile terminal or a third-party browser kernel;

if the currently used browser kernel is the self-contained browser kernel of the operating system of the mobile terminal, determine whether or not the webpage opened by the user adopts a page markup language (e.g. wml language) not supported by the self-contained browser kernel of the operating system of the mobile terminal, if so, switch to the third-party browser kernel for processing;

If the currently used browser kernel is a third-party browser kernel, determine whether or not the webpage opened by the user adopts a page markup language (e.g. html language) not supported by the third-party browser kernel, if so, transfer an access via a cloud server or determine, by the cloud server, whether or not to switch to the self-contained browser kernel of the operating system of the mobile terminal for processing, otherwise, open the page using the third-party browser kernel.

Transferring an access via a cloud server achieves high speed and saves the traffic of the user. Some pages (e.g. html4 page) can be processed rapidly by a cloud server while the traffic is saved.

d. configure a screen fitting white list in a mobile terminal, determine whether or not the web address accessed by the mobile terminal (e.g., opened by the user) is on the screen fitting white list in the use of the self-contained browser kernel of the operating system of the mobile terminal, if so, forcedly parse the page using a third-party browser kernel, otherwise, open the page using the self-contained browser kernel of the operating system of the mobile terminal.

e. configure a white list of self-contained browser kernels of the operating system of a mobile terminal in the mobile terminal, determine whether or not the web address accessed by the mobile terminal is on the white list of self-contained browser kernels of the operation system of the mobile terminal in the use of a third-party browser kernel, regardless of whether or not the page opened by the user adopts a page markup language not supported by the self-contained browser kernels of the operating system of the mobile terminal, if the web address accessed by the mobile terminal is on the white list of self-contained browser kernels of the operation system of the mobile terminal (e.g. a webkit white list), forcedly parse the page using a self-contained browser kernel of the operating system of the mobile terminal.

f. determine a network environment when a page is opened using the self-contained browser kernel of the operating system of a mobile terminal or the third-party browser kernel, prompt the user to switch to the third-party browser kernel if the network environment is 2G in the use of the self-contained browser kernel of the operating system of the mobile terminal, or prompt the user to switch to the self-contained browser kernel of the operating system of the mobile terminal if the network environment is 3G or WIFI in the use of the third-party browser kernel.

The cloud intelligent recognition and kernel control module 20 is located at a cloud server terminal to control the kernel parse mode of a website accessed via a server, transfer the access to a page markup language not supported by the third-party browser kernel, and determine whether or not there is a need to switch to the self-contained browser kernel of the operating system of the mobile terminal for processing.

In the case where the user uses a third-party browser kernel, as the third-party browser kernel is incapable of parsing a web (e.g. html5) page independently, the access to a webAPP application on a webpage must be transferred via a cloud server, the cloud terminal intelligently determines the type of the webpage according to the opposite server, performs a layout processing if the page is an html4 page and returns the processed page to the mobile terminal, or forcedly requires the client to use a webkit kernel to request for the parsing for the page if the page is an html5 page or the page is on a cloud webkit white list, and similarly, requires the third-party browser kernel to parse the page if the page is on a white list of mandatory direct connections of the third-party browser kernel.

A white list of self-contained browser kernels of the operation system of a mobile terminal (e.g. a webkit white list) may be configured in the cloud intelligent recognition and kernel control module 20, whether or not the web address opened by the user is on the white list of self-contained browser kernels of the operation system of the mobile terminal configured in the cloud server is determined when an access is transferred via the cloud server, if so, the mobile terminal is required to forcedly parse the page using a self-contained browser kernel of the operating system of the mobile terminal.

In the cloud intelligent recognition and kernel control module 20, if no white list of self-contained browser kernels of the operation system of a mobile terminal is configured in the cloud server or the web address opened by the user is not on the white list of self-contained browser kernels of the operation system of a mobile terminal configured in the cloud server, whether or not a page feature indicating the mandatory presentation of the page opened by the user using the self-contained browser kernel of the operating system of the mobile terminal, for example, the WPtouch theme page of wordpress (a blog platform), is contained in the page opened by the user, if so, the mobile terminal is required to parse the page forcedly using the self-contained browser kernel of the operating system of the mobile terminal.

The background kernel control module is located in a background server to configure a white list related to each kernel, intelligently and flexibly configure a client page parsing and layout kernel and realize the control over a page parsing kernel corresponding to a domain name by configuring a corresponding kernel control white list. Specific white lists may include: a white list of mandatory direct connections of third-party browser kernel (forcedly opened through the direct connection with a third-party browser kernel without being processed by a cloud server), a screen fitting white list (forcedly opened using a third-party browser kernel), a webkit white list (configured by the background kernel control module and distributed to a client through resource distribution), a single page mandatory direct connection white list (configured by a cloud compression engine and forcedly returned to a client through a direct connection identifier when it comes to a problematic page).

Figure 2:
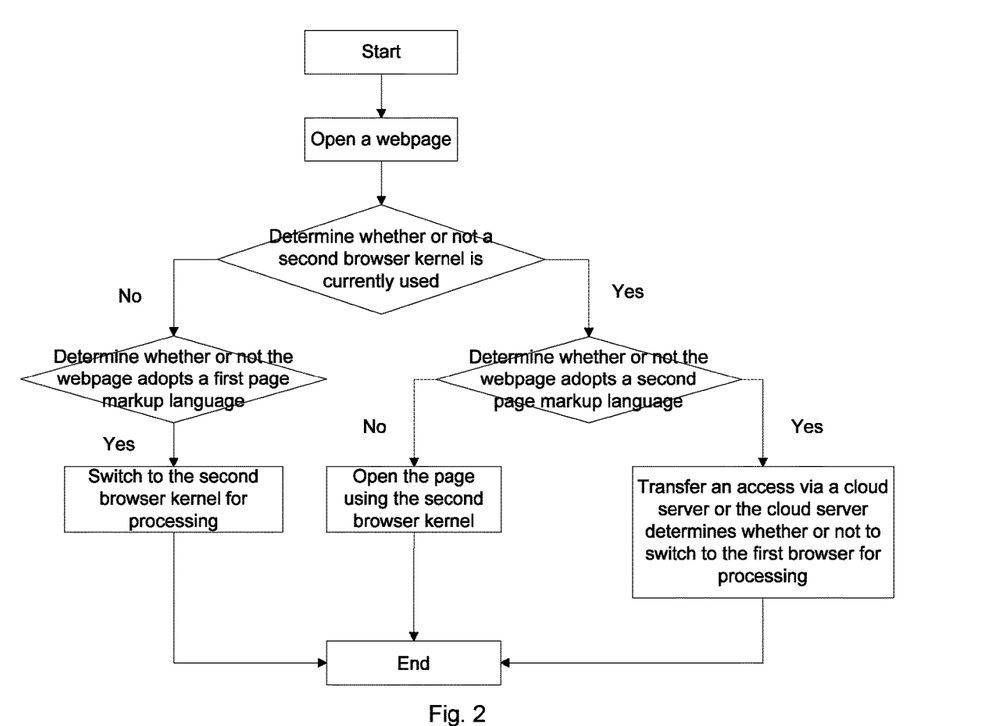
FIG. 2 is a flowchart illustrating an intelligent browser kernel switching flow in accordance with some embodiments.

As shown in FIG. 2, the intelligent browser kernel switching flow may include:

1. Determining which one of a first and a second browser kernel is the browser kernel currently used by the mobile terminal.

2. Determining whether or not the webpage accessed by the mobile terminal (e.g., opened by a user) adopts a first page markup language (e.g., wml) if the currently used browser kernel is the first browser kernel, if so, switching to the second browser kernel for processing;

3. Determining whether or not the webpage accessed by the mobile terminal adopts a second page markup language (e.g., html) if the currently used browser kernel is the second browser kernel, if so, transferring an access via a cloud server or determining, by the cloud server, whether or not to switch to the first browser kernel for processing. If the webpage does not adopt the second page markup language, opening the page using the second browser kernel. For example, a page of a wap type is opened using the second browser kernel, and a page of an html type is transferred to a piece of middleware (that is, a cloud server) for processing.

Figure 3:
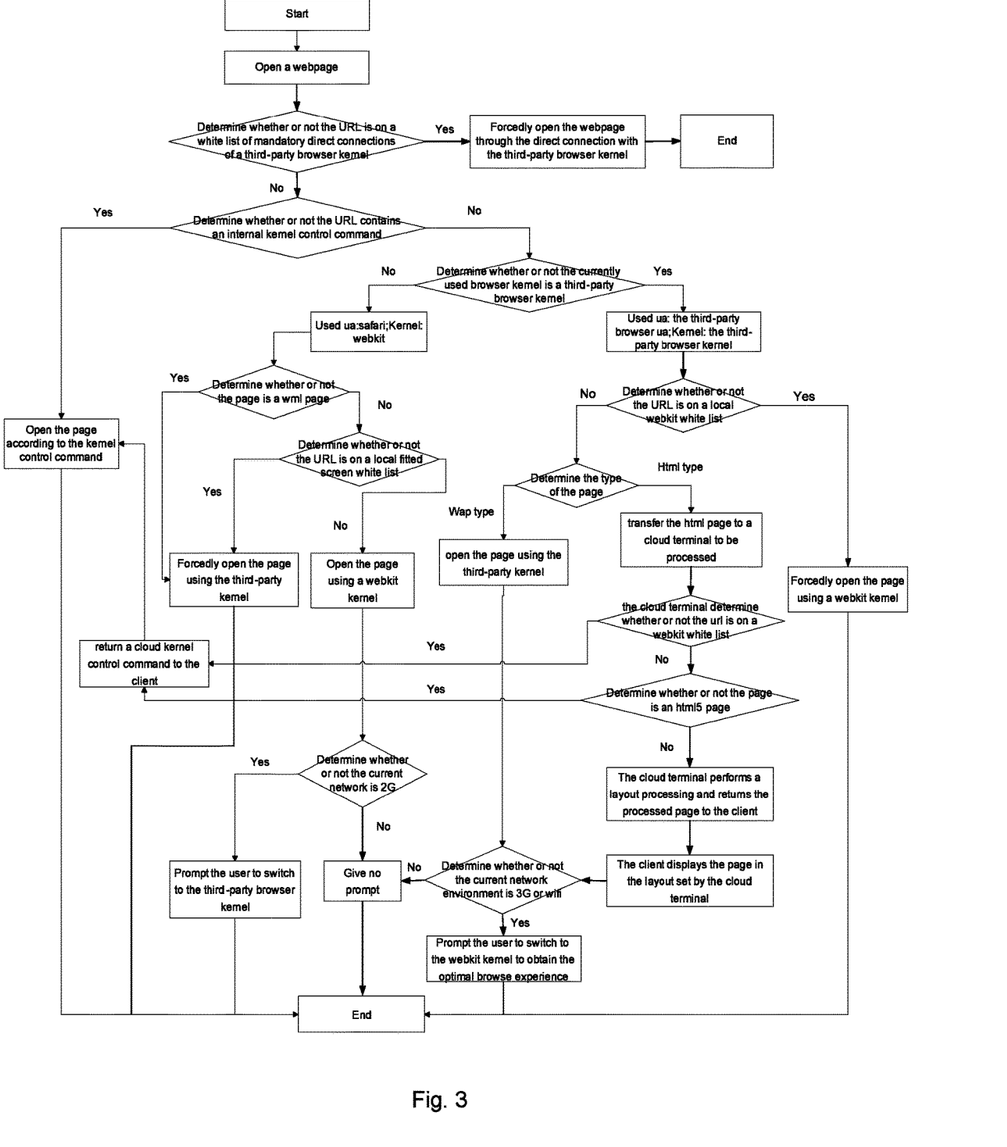
FIG. 3 is a flowchart illustrating an intelligent browser kernel switching flow in accordance with some embodiments.

As shown in FIG. 3, an intelligent browser kernel switching flow may include:

1. The user opens a webpage on a mobile terminal, such as by inputting a URL (web address). The mobile terminal determines whether or not the URL is on a white list of mandatory direct connections of a third-party browser kernel, if so, forcedly opens the webpage through the direct connection with the third-party browser kernel.

2. If the URL is not on the white list of mandatory direct connections of the third-party browser kernel, whether or not the webpage opened by the user contains an internal kernel control command (e.g., a mandatory kernel parsing command) is determined, if so, a suitable kernel is selected for parsing according to the command.

3. If the webpage opened by the user contains no internal kernel control command, the browser mode currently set by the user is determined.

4. If the browser mode is a third-party browser kernel mode, then whether or not the URL is on a local webkit white list (distributed by the background control module) is determined. If the URL is on the local webkit white list, the webpage is forcedly opened using a webkit kernel. If the URL is not on the local webkit white list, the types of the URL and page media are determined according to the original determination logic. If the page can be parsed by being directly connected with a third-party browser kernel, then the page is parsed by being directly connected with the third-party browser kernel. If the page cannot be parsed by being directly connected with the third-party browser kernel, the access to the page is transferred via a cloud server. For example, a page of a wap type is opened using the third-party browser kernel, and a page of an html type is transferred to a piece of middleware (that is, the cloud server) for processing.

In the case of access transfer, the cloud server first determines the url to check whether or not the url is on the webkit white list (stored in the cloud server) of the cloud server, if so, returns a cloud kernel control command to the client rather than transfer the access, to instruct the client to switch to the webkit kernel to re-access the url. If the URL is not on the webkit white list, the cloud server determines whether or not the page is an html5 page, and if so, returns a cloud kernel control command to the client to indicate the client to switch to the webkit kernel to re-access the url. If the page is not an html5 page, the could server transfers the access via a server, then a piece of middleware performs a layout processing and returns the processed page to the client, and the client displays the page in the layout set by the middleware.

5. If the user selects the self-contained browser kernel of the operating system of the mobile terminal, then whether or not the page is wml is determined, if so, the page is forcedly opened using a third-party browser kernel, otherwise, whether or not the URL is on a local screen fitting white list is determined, if so, the page is forcedly opened using the third-party browser kernel, otherwise, the page is opened using a webkit kernel according to the selection of the user.

6. A network environment is determined when the page is opened using a webkit browser kernel or a third-party browser kernel in Step 4 or Step 5. If the network environment is 2G in the use of the webkit kernel, the user is prompted to switch to the third-party browser kernel, and if the network environment is 3G or WIFI in the use of the third-party browser kernel, the user is prompted to switch to the webkit kernel.

The network environment is determined to remind the user that kernels can be switched optionally to obtain the optimal browse experience. On the whole, the determination on a white list refers to the determination of whether or not the white list is a webkit white list in the use of a third-party browser kernel or the determination of whether or not the white list is a third-party browser kernel white list in the use of a webkit white list.

With the use of two browser kernels (a third-party browser kernel and a webkit kernel), a CS architecture (a browser client and a cloud compression server) and a serving background (a white list configuration background), the disclosure is capable of intelligently helping the user match the optimal browser kernel for parsing a page to address the problem existing the related art that wap1.0 page cannot be parsed by a webkit kernel or that the layout of a web (e.g. html5) page accessed using a non-webkit kernels is out of order and intelligently determining the current network environment to give a proper kernel switching prompt. Based on a cloud architecture, the disclosure is capable of configuring a corresponding kernel white list at a cloud terminal to realize a flexible kernel switching rapidly and an intelligent recognition on an html 5 page, thus, the disclosure can control, at any time, a browser to parse pages using different kernels to meet the requirements of related services on page presentation.

Apparently, it should be appreciated by those skilled in the art that each module or step described in the disclosure can be realized by a configured computer and that the modules or steps may be integrated on a single computer or distributed on a network consisting of a plurality of computers, optionally, the modules or steps may be realized by program codes executable to a computing device so that the modules or steps can be stored in a memory and executed by the computing device which may be, for example, the processor of a CPU. Optionally, the computing device is configured in a hand-hold mobile terminal such as a mobile phone, a PDA or a tablet computer. Moreover, in some cases, the steps illustrated or described herein may be executed in a sequence different from that described herein or formed into integrated circuit modules, or several modules or steps are formed into a single integrated circuit module. Therefore, the disclosure is not limited to any specific combination of hardware and software.

It should be appreciated here that the computer-readable storage device (e.g. memory) mentioned herein may be a volatile memory or a nonvolatile memory or both of them. As an example but not a limitation, the nonvolatile memory may include a Read-Only Memory (ROM), a Programmable Read-Only Memory (PROM), an Electrically Programmable Read-Only-Memory (EPROM), an Electrically Erasable Programmable Read-Only Memory (EEPROM) or a flash memory. The volatile memory may include a Random Access Memory (RAM) which may serve as an external cache memory. As an example but not a limitation, the RAM may be obtained in a plurality of forms, such as a Synchronous Random Access Memory (SRAM), a Dynamic Random Access Memory (DRAM), a Synchronous Dynamic random access memory (SDRAM), a Double Data Rate Synchronous Dynamic Random Access Memory (DDR SDRAM), an Enhanced SDRAM (ESDRAM), a Synchronous Link DRAM (SLDRAM) and a Direct Rambus RAM (DRRAM). The storage device disclosed herein is intended to include, but is not limited to, those and other storages of suitable types.

It also should be appreciated by those skilled in the art that the exemplary logic blocks, modules, circuits and algorithm steps may be implemented as electronic hardware, computer software or combinations thereof. To clarify the interchangeability of hardware and software, various illustrative components, blocks, modules, circuits and steps have been described generally in terms of their functionality. Whether such functionality is implemented as software or hardware depends upon specific applications and design constraints imposed on the overall system. Those skilled in the art can implement the functionality in various ways for specific applications, but such implementation decisions should not be interpreted as causing departure from the scope of the disclosure.

The various illustrative logical blocks, modules, and circuits described in connection with the embodiments disclosed herein may be implemented or performed with the following components: a general purpose processor, a digital signal processor (DSP), an application specific integrated circuit (ASIC), a field programmable gate array signal (FPGA) or other programmable logic devices, discrete gates or transistor logics, discrete hardware components, or any combination thereof. The general purpose processor may be a microprocessor, but in the alternative, the processor may be any conventional processor, controller, microcontroller, or state machine. The processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the hardware and the software module. The software module may reside in an RAM, a flash memory, an ROM, an EPROM, an EEPROM, a register, a hard disk, a removable disk, a CD-ROM, or any other form of storage medium known in the art. An exemplary storage medium is coupled to the processor so that the processor can read information from, and write information to, the storage medium. In an alternative, the storage medium may be integrated with the processor. The processor and the storage medium may reside in an ASIC. The ASIC may reside in a user terminal. In an alternative, the processor and the storage medium may reside as discrete components in a user terminal.

While example embodiments of the disclosure have been described above with reference to accompanying drawings, a variety of modifications can be devised by those skilled in the part without departing from the scope and spirit of the disclosure. For example, the feature illustrated or described as one part of an embodiment may be applied to another embodiment to achieve another embodiment. The above is merely example practical embodiments of the disclosure but not limitation to the scope of the disclosure, and any That which is claimed:

1. An intelligent switching method for browser kernels, comprising:

determining, by a processor in a mobile terminal, which one of the first browser kernel and the second browser kernel is a currently used browser kernel by the mobile terminal wherein the first browser kernel is a self-contained browser kernel of an operating system of the mobile terminal, and the second browser kernel is a third-party browser kernel;

in response to determining that the currently used browser kernel is the first browser kernel, determining, by the processor, whether a webpage accessed by the mobile terminal adopts the first page markup language, unparsable by the first browser kernel and parsable by the second browser kernel;

in response to determining that the webpage adopts the first page markup language, switching, by the processor, to the second browser kernel for processing and opening the webpage using the second browser kernel;

in response to determining that the currently used browser kernel is the second browser kernel, determining, by the processor, whether the webpage adopts the second page markup language, unparsable by the second browser kernel; and in response to determining that the webpage adopts the second page markup language, transferring, by the processor, an access via a cloud server and determining, by the cloud server, whether or not to switch to the first browser kernel for processing, wherein a network environment is determined when the page is opened using the first browser kernel or the second browser kernel, if the first browser kernel is used and the network environment is 2G, then the user is prompted to use the second browser kernel; and when the second browser kernel is used and the network environment is 3G or WIFI, the user is prompted to use the first browser kernel.

2. The intelligent switching method for the browser kernels according to claim 1, wherein the first browser kernel is a webkit kernel, and the first page markup language is a Wireless Markup Language (WML).

3. The intelligent switching method for the browser kernels according to claim 1, wherein the second page markup language is a Hyper Text Markup Language (HTML).

4. The intelligent switching method for the browser kernels according to claim 1, wherein a white list of mandatory direct connections of the second browser kernel is configured in the mobile terminal, and whether or not a web address opened by a user is on the white list of mandatory direct connections of the second browser kernel is determined before the browser kernel currently used by the user of the mobile terminal is recognized, and the page is forcedly parsed using the second browser kernel if the web address opened by the user is on the white list of mandatory direct connections of the second browser kernel.

5. The intelligent switching method for the browser kernels according to claim 4, wherein, before the browser kernel currently used by the user of the mobile terminal is recognized, if the white list of mandatory direct connections of the second browser kernel is not configured in the mobile terminal or the web address opened by the user is not on the white list of mandatory direct connections of the second browser kernel, then whether or not a mandatory kernel parse command is carried in the web address opened by the user is determined, and if a mandatory kernel parse command is carried in the web address opened by the user, the page is forcedly parsed using a corresponding browser kernel.

6. The intelligent switching method for the browser kernels according to claim 1, wherein a screen fitting white list is configured in the mobile terminal, in a case where the first browser kernel is currently used, if the second page markup language is not adopted by the webpage opened by the user, then whether or not the web address opened by the user is on the screen fitting white list is determined, if so, the page is forcedly parsed using the second browser kernel, otherwise, the page is opened using the first browser kernel.

7. The intelligent switching method for the browser kernels according to claim 1, wherein a first browser kernel white list is configured in the mobile terminal, in a case where the second browser kernel is currently used, whether or not the web address opened by the user is on the first browser kernel white list is determined, regardless of whether or not the first page markup language is adopted by the webpage opened by the user, if the web address opened by the user is on the first browser kernel white list, the page is forcedly parsed using the first browser kernel.

8. The intelligent switching method for the browser kernels according to claim 1, wherein a first browser kernel white list is configured in the cloud server, whether or not the web address opened by the user is on the first browser kernel white list is determined when an access is transferred by the cloud server, and if the web address opened by the user is on the first browser kernel white list, the mobile terminal is required to forcedly parse the page using the first browser kernel.

9. The intelligent switching method for the browser kernels according to claim 8, wherein if no first browser kernel white list is configured in the cloud server or the web address opened by the user is not on the first browser kernel white list of the cloud server, then it is determined whether or not a page feature requiring to be presented using the first browser kernel is contained in the page opened by the user, and if a page feature requiring to be presented using the first browser kernel is contained in the page opened by the user, the mobile terminal is required to forcedly parse the page using the first browser kernel.

10. A non-transitory computer-readable medium on which processor-executable program codes are stored, wherein the program codes, when executed, cause a processor to:

determine which one of a first browser kernel and a second browser kernel is the browser kernel currently used by a user of a mobile terminal wherein the first browser kernel is a self-contained browser kernel of an operating system of the mobile terminal, and the second browser kernel is a third-party browser kernel;

determine whether a webpage opened by the user adopts a first page markup language, unparsable by the first browser kernel and parsable by the second browser kernel, when the currently used browser kernel is the first browser kernel, then switch to the second browser kernel for processing; and determine whether the webpage opened by the user adopts a second page markup language, unparsable by the second browser kernel, if the currently used browser kernel is the second browser kernel, if so, transfer an access via a cloud server and enable the cloud server to determine whether to switch to the first browser kernel for processing; otherwise, open a page using the second browser kernel, wherein a network environment is determined when the page is opened using the first browser kernel or the second browser kernel, if the first browser kernel is used and the network environment is 2G, then the user is prompted to use the second browser kernel; and when the second browser kernel is used and the network environment is 3G or WIFI, the user is prompted to use the first browser kernel.

11. An intelligent switching system, comprising:
a mobile terminal; a cloud server terminal; and a background server,
wherein the mobile terminal includes one or more processors configured to:
determine which one of a first browser kernel and a second browser kernel is a currently used browser kernel by a mobile terminal, wherein the first browser kernel unparsable to a first page markup language and the second browser kernel parsable to the first page markup language and unparsable to a second page markup language wherein the first browser kernel is a self-contained browser kernel of an operating system of the mobile terminal, and the second browser kernel is a third-party browser kernel;
in response to determining that the currently used browser kernel is the first browser kernel, determine whether or not a webpage accessed by the mobile terminal adopts the first page markup language;
in response to determining that the webpage adopts the first page markup language, switch to the second browser kernel for processing and opening the page using the second browser kernel;
in response to determining that the currently used browser kernel is the second browser kernel, determine whether the webpage adopts the second page markup language; and
in response to determining that the webpage adopts the second page markup language, transfer an access via the cloud server terminal, wherein:
the cloud server terminal provides a cloud intelligent recognition and kernel control to transfer an access to the second page markup language and determine whether or not to switch to the first browser kernel for processing; and
the background server provides a background kernel control to configure a white list related to each kernel,
wherein the intelligent client kernel control module is further configured to: determine a network environment when the page is opened using the first browser kernel or the second browser kernel; if the first browser kernel is used and the network environment is 2G, then prompt the user to use the second browser kernel; and when the second browser kernel is used and the network environment is 3G or WIFI, prompt the user to use the first browser kernel.

12. The system of claim 11, wherein the first browser kernel is a webkit kernel, and the first page markup language is a Wireless Markup Language (WML).

13. The system of claim 12, wherein the second page markup language is a Hyper Text Markup Language (HTML).

14. The system of claim 11, wherein:
a white list of mandatory direct connections of the second browser kernel is configured in the mobile terminal;
the intelligent client kernel control module is further configured to:
determine whether or not a web address opened by the user is on the white list of mandatory direct connections of the second browser kernel before the browser kernel currently used by the user of the mobile terminal is recognized; and
forcedly parse the page using the second browser kernel if the web address opened by the user is on the white list of mandatory direct connections of the second browser kernel.

15. The system of claim 14, wherein the intelligent client kernel control module is further configured to:
before the browser kernel currently used by the user of the mobile terminal is recognized, if white list of mandatory direct connections of the second browser kernel is not configured in the mobile terminal or the web address opened by the user is not on the white list of mandatory direct connections of the second browser kernel, determine whether or not a mandatory kernel parse command is carried in the web address opened by the use; and
if a mandatory kernel parse command is carried in the web address opened by the user, forcedly parse the page using a corresponding browser kernel.

16. The system of claim 11, wherein:
a screen fitting white list is configured in the mobile terminal;
the intelligent client kernel control module is further configured to:
in the case where the first browser kernel is used, if the second page markup language is not adopted by the webpage opened by the user, determine whether or not the web address opened by the user is on the screen fitting white list; and
in response to determining that the web address opened by the user is on the screen fitting white list, forcedly parse the page using the second browser kernel;
in response to determining that the web address opened by the user fails to be on the screen fitting white list, open the page using the first browser kernel.

17. The system of claim 11, wherein:
a first browser kernel white list is configured in the mobile terminal, in the case where the second browser kernel is used; and
the intelligent client kernel control module is further configured to:
whether or not the web address opened by the user is on the first browser kernel white list is determined, regardless of whether or not the first page markup language is adopted by the webpage opened by the user, if the web address opened by the user is on the first browser kernel white list, forcedly parse the page using the first browser kernel.

18. The system of claim 11, wherein:
a first browser kernel white list is configured in the cloud server; and
the intelligent client kernel control module is further configured to:
whether or not the web address opened by the user is on the first browser kernel white list is determined when an access is transferred by the cloud server, and if the web address opened by the user is on the first browser kernel white list, forcedly parse the page using the first browser kernel.

19. The system of claim 18, wherein the intelligent client kernel control module is further configured to:
- if no first browser kernel white list is configured in the cloud server or the web address opened by the user is not on the first browser kernel white list of the cloud server, determine whether or not a page feature requiring to be presented using the first browser kernel is contained in the page opened by the user; and
- in response to determining that the page feature requiring to be presented using the first browser kernel is contained in the page opened by the user, forcedly parse the page using the first browser kernel.

* * * * *